Feb. 8, 1955
C. R. MOORE
2,701,834
METHOD OF RESISTANCE WELDING OF LOW RESISTANCE
NONFERROUS METALS AND APPARATUS THEREFOR
Filed Dec. 27, 1950
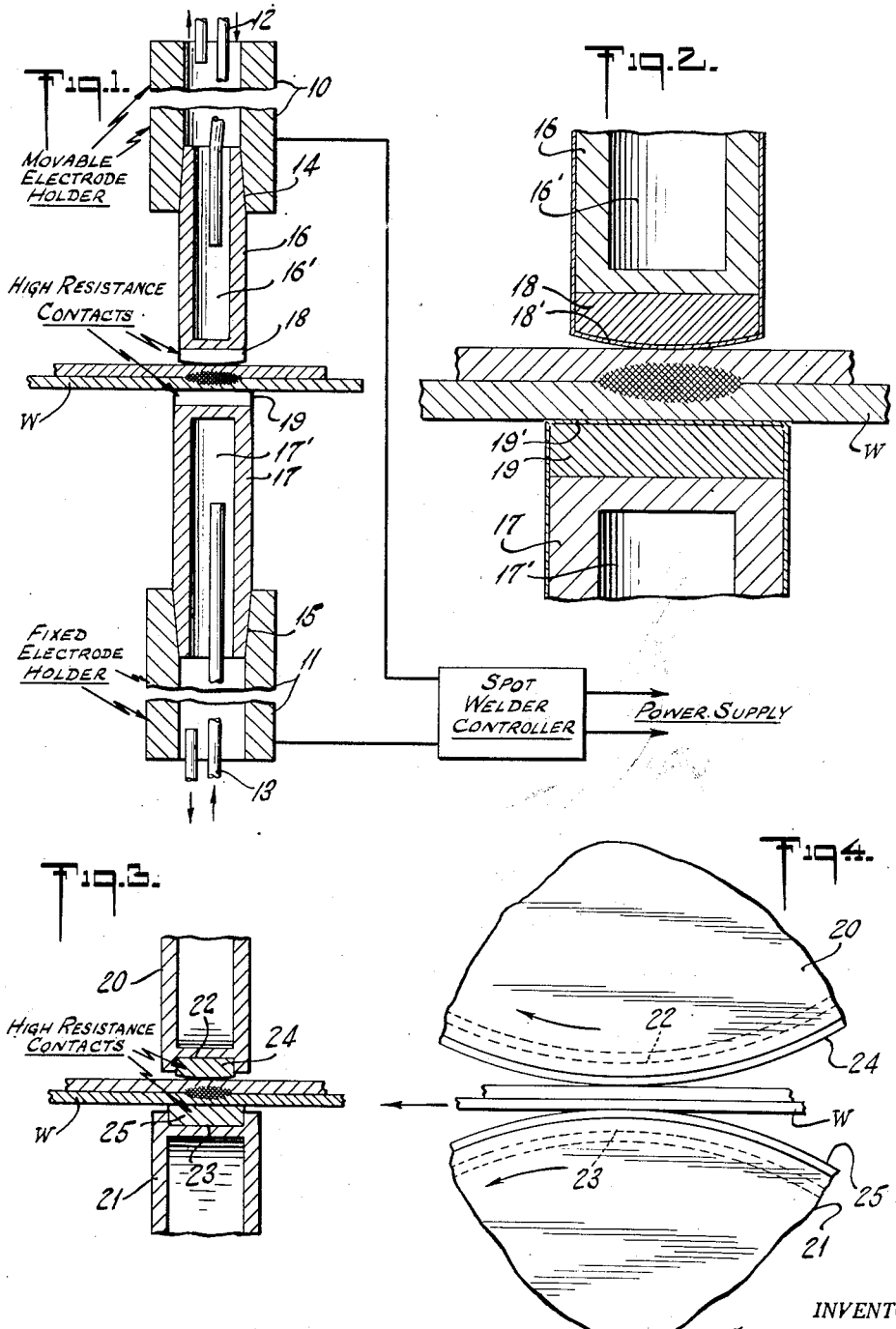
INVENTOR.
CHARLES R. MOORE
BY
John M. Col
ATTORNEY.

United States Patent Office 2,701,834
Patented Feb. 8, 1955

2,701,834

METHOD OF RESISTANCE WELDING OF LOW RESISTANCE NONFERROUS METALS AND APPARATUS THEREFOR

Charles R. Moore, Plainfield, N. J., assignor, by mesne assignments, to Alumanode Converters, Inc., a corporation of New Jersey Application December 27, 1950, Serial No. 202,952

11 Claims. (Cl. 219—10)

The present invention relates to methods of resistance welding of low resistance nonferrous metals and apparatus therefor and is more particularly directed toward welding methods and apparatus effective for spot or seam welding of aluminum, aluminum alloy sheets and the like.

In shops working on ferrous metals, resistance welding by low cost water cooled, single phase, spot or seam welders is a very common practice. The machines are available in innumerable machine shops, fabricating shops and the like. They range in size from 15 kva. to 100 kva. They require no unusual or expensive wiring arrangements, merely single phase lines of adequate capacity. No dangerous voltages are involved. The cost is relatively low and adjustments in the machines may be made to suit the work.

The welding and brazing of aluminum and aluminum alloy sheets and the like has been very difficult. This is on account of the narrow temperature range within which the work must be carried out and the spontaneous formation of an oxide coating on the surface of the aluminum which interferes with normal welding and brazing operations.

Notwithstanding the availability of spot and seam welding machines for welding ferrous metals and the like and the desire to spot and seam weld aluminum economically without special machinery and equipment, the reliable spot and seam welding of aluminum in conventional, low-cost, water-cooled, single phase, alternating current welders has not been possible. This is on account of the low electrical resistance of the metal and its high thermal conductivity. The welding temperature cannot be attained, the heat dissipation exceeding the available supply. Shops requiring spot and seam welding of aluminum, except those with very large runs of the same job, have had to have the work done by custom welders or forego such welding.

Aluminum spot and seam welding as now commercially accomplished requires not only the removal of the grease and oil from the articles to be welded, but just prior to the welding the oxide coating must be removed by chemical treatment involving the use of acids, caustics, rinses, etc., which leave the surface slightly etched.

The welding operation for such welding of aluminum is accomplished at the present time commercially only in very expensive electronic welding apparatus. This apparatus involves multi-phase current supply, transformers delivering dangerously high voltages, highly inductive or capacitative circuits for storage of energy, rectifiers, timers, etc. These machines utilize tremendous pressures between hard copper electrodes in contact with the work so that the structure of the welder per se is extremely strong, bulky and expensive. The welding operation is dependent upon the heating of the work by the current passing through it, no heat being derived from the electrode. In a few cycles, electronically timed, such machines preheat the work, discharge the high amperage current to effect fusion, and then pass reduced current for tempering the weld, all under pressures and under a succession of electrical impulse.

The electronic welding machines for aluminum have been from 10 to 15 times the size of the comparable conventional spot or seam welders for ferrous metals, and the cost in greater proportion. They can be used efficiently only on long runs of identical jobs and are incapable of ready adjustment for different jobs, an expert technician not ordinarily available in the particular shop being required for this purpose. For these reasons aluminum spot and seam welding has heretofore been confined to factories with large enough volume of business to warrant the allotment of space and the large investment, or to custom welders similarly equipped.

The present invention makes possible the spot or seam welding of nonferrous, low resistance metals, more particularly aluminum and aluminum alloy sheets and the like, makes possible the elimination of chemically cleaning or removal of the aluminum oxide coating, all without requiring the use of highly expensive special electronic welding equipment.

The conventional single-phase, water cooled spot and seam welder commonly used in the spot and seam welding of ferrous metals employs a pair of water cooled, low resistance, copper electrodes pressed against the work by air pressure. A timed current surge is passed through the electrodes and work, and the resistance in the work effects a heating of the work. The electrodes are relatively massive, are excellent thermal conductors and the heat conducted to them from the welding operation is quickly dissipated by the cooling water.

According to the present invention, the conventional welder just described is converted into a machine for spot or seam welding aluminum and other nonferrous, low resistance metals. This conversion involves the employment of similar, massive, water-cooled electrodes provided with relatively small contacts of high resistance metal which quickly come to the welding temperature, correspondingly elevate the temperature of the work, and upon cutting off the current, quickly dissipate the heat in the weld and the contacts to the electrode and the coolant.

It has been discovered that the only change which need be made in the conventional single-phase spot or seam welder is to substitute, for each of the two common, water cooled copper electrodes used in direct contact with the ferrous metal, similar special electrodes provided with high resistance contacting surfaces of long life for use with the aluminum or other metal.

Owing to the high electrical and thermal conductivity of the aluminum, one cannot, in the absence of the extreme pressures of the electronic welder, rely upon the inherent resistance of the aluminum to heat itself.

The new electrode carried contacts, to be described, have high ohmic resistance, are non-porous, exceedingly smooth and hard at the welding temperature of the work, and have no undesired effect on the work. These electrodes should preferably be capable of more rapid heat transfer than those used in the ferrous metal welders to enable the coolant to rapidly abstract the heat.

Because heat is applied to both surfaces of the work by reason of the electrical resistance of the adjacent contacts, it is possible to fuse low resistance nonferrous metals so that like metals or unlike metals may be joined with one another as well as uniting one of them directly with a ferrous metal. The size and thickness of contact, pressure employed, current employed and timing are variable, ordinarily determined in advance for each condition under which the welding operation is to be carried out.

These contacts may be secured to the body of the copper electrode as by brazing, silver soldering, or welding, and the thickness preferably varies with the thickness of the work. The outer or work engaging faces of the tips are preferably ground and polished to provide very smooth surfaces and are preferably provided with an extremely hard plating of metal such as rhodium or chromium. One of the tips is preferably rounded, the other is flat, or very nearly so.

The accompanying drawings show, for purposes of illustrating the present invention, two embodiments in which the invention may take form, it being understood that the drawings are illustrative of the invention rather than limiting the same.

In the accompanying drawings:

Figure 1 is a sectional view through the water cooled electrodes and the contact tips of a spot welding machine, showing two pieces of metal welded together between the tips;

Figure 2 is a fragmentary view showing portions of the electrodes and the contact tips at an enlarged scale; and Figures 3 and 4 are fragmentary sectional and elevational views through seam welding apparatus employing wheel electrodes, provided with annular high resistance, contacts.

In Figure 1, the upper and lower conventional electrode holders are indicated at 10 and 11, respectively. These holders are mounted as usual in the machine, connected as usual to the power supply, and are connected to the coolant supply and the return or drain, in the usual manner. The piping is indicated diagrammatically at 12 and 13. The holders 10 and 11 have tapered bores as indicated at 14 and 15 to receive tapered copper electrodes 16 and 17 as usual.

These electrodes may be of the same size and dimension as the copper electrodes which should be used in the same sized machine for the welding of ferrous metals, except that they may be shorter to provide room for the high resistance tips.

The ends of the copper electrodes 16 and 17 are flat and smooth and the new contacts or tips 18 and 19 are secured to these copper electrodes as by brazing, silver soldering or welding so as to provide extremely intimate electrical and thermal contact of the metal of the contact or tip with the metal of the electrode body proper.

In order to facilitate the dissipation of heat to the coolant after the welding operation is completed, the drilling 16' and 17' in the electrodes are carried as near as possible to the outer face of the copper body of the electrode this thickness of copper would ordinarily be in the order of $\frac{1}{16}$ or $\frac{1}{32}$ inch.

The upper contact is indicated at 18 and the lower contact at 19. These contacts are accurately and carefully ground to provide very smooth surfaces, the lower contact having a flat upper surface, the upper contact having a rounded or spherical lower surface, and the flat contact preferably larger than the rounded one. The contacts are provided with a hard plating indicated at 18' and 19' to provide a "glass-like" surface, this plating being preferably rhodium or chromium, and may extend on to the electrode body.

These contacts are made of high resistance metal and are used on opposite sides of the work W (which may be two or more sheets). When current is turned on, the I²R "losses" (heat) are concentrated in these contacts to bring them to temperature in excess of the welding temperature and this heat is conductively transmitted to the interposed work against which they bear. The heat surge is transmitted from the hot front of the flat faced contact to the work throughout the area of the flat faced contact, while the surge of heat from the rounded contact is transmitted through a smaller area, the actual area depending upon the pressure employed in pressing the contacts against the work and the penetration of the hard tip into the soft or yielding metal. As the heated metal softens, the continued pressure causes a further displacement of the hot metal. This progressively increases the diameter of the core of the weld. The extent of contact penetration, however, is limited because of the rapid increase of the area with the increase of diameter of the area in contact. This insures the concentration of heat at the center of the weld and avoids pushing the metal out beyond the contacts and avoids ridges which would have to be ground off if a smooth surface is desired.

The use of two high resistance contacts is most important, for then heat is conductively transmitted in both directions to the surfaces to be welded. A single high resistance electrode is not satisfactory as the heat would come from one side while the other side is chilled by the rapid cooling of the high conductivity, low resistance electrode subjected to continual cooling. Only unreliable, haphazard welds might be obtained, without proper fusion on the unheated side.

The new method of spot welding is, it will be seen, considerably different from the conventional method employed in ferrous metal spot welding. In ferrous metal welding, the fusion of the metal is obtained as the result of the high resistance of the ferrous metal to the flow of current and the source of heating is in the work itself rather than in the copper electrodes. Owing to the low resistance of the work, typically aluminum, and the high resistance of the two contacts employed in accordance with the present invention, the source of heat is extraneous of the work and the heat flows from the tips toward the meeting faces of the pieces of work being welded.

Where aluminum with the usual oxide is being welded, there is a concentration of electrical resistance in the work at the meeting faces of the sheets on account of the high resistance, oxide coatings in contact with one another. This resistance provides a secondary source of heating which builds up the temperature in the oxide and dissipates the oxide. In the present process, the insufficient I²R "loss" (heat) in the work is compensated for by I²R "loss" (heat) in the contacts or tips, and there is a flow of heat energy in both directions from the contacts or tips toward the engaging metal surfaces to be welded.

The elimination of the chemical cleaning to remove oxide coating from aluminum makes it possible to carry out the work without the installation of chemical equipment and without the maintenance of a working staff for the purpose. Cleaned aluminum can be similarly welded.

In the spot welders, Figures 1 and 2, the working faces of the contacts are round buttons or disks and the contacts size will vary with the spot size and rating of the machine with which they are to be used. The thicker the work, the more heat energy is required to bring it to the welding temperature, and thicker high resistance contacts are used so as to build up the overall resistance and augment the heat energy available. For welding of two sheets of 0.040" aluminum together, it has been found that a top contact ½" in diameter and $\frac{3}{32}$" thick and a bottom contact ⅝" in diameter and ⅛" thick energized for 0.1 second are satisfactory. The thickness and diameter of the high resistance contacts increases with thickness of work. The electrodes and tips are made in various configurations and shapes to accommodate specific jobs.

The seam welding apparatus of Figures 3 and 4 resembles the seam welding apparatus ordinarily used for the seam welding of ferrous metals. In such apparatus water cooled, hard copper rollers are pressed against the work and driven to pass the work between them and intermittently energized with welding current so as to effect a series of closely spaced spots.

For seam welding of nonferrous metals, for the present invention, the water cooled welding rollers or wheels 20 and 21 of Figures 3 and 4 are recessed as indicated at 22 and 23 to accommodate the thin bands 24 and 25 of high resistance metal. These bands protrude slightly beyond the work faces of the wheels so as to be the sole contacting medium with the work. In one of the wheels, the face of the high resistance band is preferably cylindrical, while the face of the band in the other wheel is toroidal and preferably narrower. The contact bands are similarly plated with hard metal. The work contacting areas of the high resistance bands 24 and 25 act the same as the disk-like contacts of Figures 1 and 2.

Many metals and alloys are known to have higher electrical resistance than iron, and the selection of contact material is made from such high resistance metals and alloys. High resistance, however, is not the only criterion which must be considered in selecting the material to be employed. When certain of these higher resistance metals are brought up to the high temperatures required for such welding, the metals soften, become porous and the fused metal of the work pieces may wet or adhere to the hot high resistance metal. It has been found that while a few welds might be satisfactorily made with various high resistance metals, even including iron contacts, the successive welds become progressively worse because of deterioration of the contacts, which involves expense for cleaning, changing, refacing and the like, or complete discarding of the contacts.

For high speed trouble-free operation, it is desirable, however, to have both contacts made of high resistance nonferrous metal, smooth and hard at the welding temperature and having no undesired effect on the metal being worked upon and the minimum of pitting or deterioration.

For the purpose of aluminum welding, high resistance contacts have been found to be held effective when of a high nickel content, i. e., including (1) pure nickel; (2) high temperature resistant nickel-manganese alloy (95.5% Ni, 4.5 Mn) known as "D-Nickel"; (3) a heat treatable nickel alloy known as "Z-Nickel" or "Duro-Nickel" and containing 93.7% Ni, 4.4% Al, with minor percentages of Cu, Fe, Mg and Si; (4) a heat resistant, corrosive resistant alloy known as "Inconel," and having 79.5% Ni, 13% Cr and 6.5% Fe; and (5) an alloy of 95% Ni and 5% Cr.

The "Z-Nickel" preparation appears to be the best, the "D-Nickel" and "Inconel" is almost as good, the pure nickel and the nickel-chromium-alloy not quite so good. The resistivity of the contact material and its ability to perform with minimum deterioration or impairment to the quality of the weld are the principal properties which determine the comparative values of the high resistance contacts.

In practicing the present invention, it has been possible to spot weld any combination of aluminum, magnesium, brass, and copper, by means of two high resistance contacts, and iron, to any of these metals by use of one high resistance contact in contact with the low resistance metal, and ordinary copper electrode being applied to the iron.

What is claimed is:

1. The method of spot welding metal sheets having relatively low electrical resistance by the aid of massive liquid-cooled electrodes having relatively high resistance nickel contacts opposite one another and pressed against the outer faces of the sheets, which comprises momentarily passing electric current through the electrodes, the contacts and the work to generate heat in the contacts, conductively transferring heat energy to the interposed sheets from both sides to attain welding temperature, thereupon discontinuing the current, and cooling the electrodes and the welded metal.

2. The method of spot welding sheet aluminum, which comprises initially creating on opposite sides of the sheets in contacts of high nickel content pressed against the sheets on opposite sides thereof a resistance produced temperature in excess of the welding temperature, raising the temperature of the interposed sheets to welding temperature by conduction across the sheets at a rate in excess of the withdrawal of heat by conduction along the sheets, discontinuing the supply of current and cooling the electrodes and welded metal of the sheets.

3. The method of spot welding aluminum sheets and the like, having the normal aluminum oxide coating, which comprises placing two such sheets between liquid cooled electrodes having high resistance contacts of high nickel content and having nonporous surfaces non-adherent to aluminum at welding temperatures, pressing the electrode contacts against the opposite faces of the sheets to provide electrical connection from electrode to electrode, passing heating current through the same for a period only sufficient to electrically heat the contacts to welding temperature, dissipate the oxide coatings in contact and effect fusion and flow of the metal between the contacts, and maintaining pressure while the electrodes and welded sheets cool below the fusion range.

4. The method of claim 3, according to which one face of the pair of sheets has substantially uniform heat and pressure over the area of the corresponding contact, while the heat and pressure applied to the other face diminishes outwardly from the center toward the periphery thereof to produce a temperature gradient and confine the highest temperature metal to the center of the weld.

5. Spot welding apparatus for the welding of low resistance, nonferrous metal parts comprising two massive, liquid cooled electrodes facing one another, each having heating means in the form of a high resistance contact having a non-porous, nonadherent surface at the welding temperature, the contacts being provided with a metal plating harder than the resistance metal, each contact being of restricted area and of relatively low mass and when concurrently pressed against the work and energized from a source of welding current electrically generating heat for effecting fusion of the interposed metal parts.

6. Spot welding apparatus for the welding of low resistance, nonferrous metal parts comprising two massive, liquid cooled electrodes facing one another, each having heating means in the form of a high resistance predominantly nickel contact having a non-porous, nonadherent surface at the welding temperature, each contact being of restricted area and of relatively low mass and when concurrently pressed against the work and energized from a source of welding current electrically generating heat for effecting fusion of the interposed metal parts.

7. Spot welding apparatus for the welding of low resistance, nonferrous metal parts comprising two massive, liquid cooled electrodes facing one another, each having heating means in the form of a high resistance contact having a non-porous, nonadherent surface at the welding temperature, each contact being made from high nickel alloys selected from the group consisting of pure nickel, 94% to 96% nickel, with approximately 4% to 6% of aluminum, or manganese or chromium, or mixtures thereof, the nickel 79.5%, chromium 13% and iron 6.5%, each contact being of restricted area and of relatively low mass and when concurrently pressed against the work and energized from a source of welding current electrically generating heat for effecting fusion of the interposed metal parts.

8. An electrode contact for metal spot welding machine, said electrode having a tip made of high nickel alloys selected from the group consisting of pure nickel, 94% to 96% nickel with approximately 4% to 6% of aluminum, or manganese or chromium, or mixtures thereof, and nickel 79.5%, chromium 13% and iron 6.5%.

9. An electrode contact, such as claimed in claim 8, wherein the surface of the contact is plated with a metal selected from the group consisting of rhodium and chromium.

10. A combined electrode and contact for spot welding comprising a copper electrode body with a flat face and having a coolant passage extending substantially to the said face so that only a thin wall of copper remains, and high resistance high nickel alloy contact secured to said face and having a nonporous surface non-adherent to aluminum at the welding temperature of aluminum, the contact being capable of quick resistance heating to welding temperature and relatively rapid cooling after the current flow is stopped.

11. An electrode for aluminum spot welding such as claimed in claim 10, wherein the face of the contact is convex in all directions so as to produce the greatest current density at the center and provide an area of contact which varies with the pressure.

References Cited in the file of this patent

UNITED STATES PATENTS

| | | |
|---|---|---|
| 1,134,007 | Prostler | Mar. 30, 1915 |
| 1,176,614 | Stanley | Mar. 21, 1916 |
| 1,296,780 | Dyer | Mar. 11, 1919 |
| 1,568,080 | Meadowcroft | Jan. 5, 1926 |
| 1,618,764 | Lunn | Feb. 22, 1927 |
| 2,282,186 | Henninger | May 5, 1942 |

OTHER REFERENCES

Dunlap: "The Welding Engineer," December 1929, pages 37, 38.